(12) United States Patent
Ginster, II et al.

(10) Patent No.: US 9,818,079 B2
(45) Date of Patent: Nov. 14, 2017

(54) SYSTEM AND METHOD OF INVENTORY MANAGEMENT

(75) Inventors: William G. Ginster, II, Webster, NY (US); Joseph P. Napoli, Pittsford, NY (US)

(73) Assignee: Ortho-Clinical Diagnostics, Inc., Rochester, NY (US)

(*) Notice: Subject to any disclaimer, the term of this patent is extended or adjusted under 35 U.S.C. 154(b) by 378 days.

(21) Appl. No.: 13/474,007

(22) Filed: May 17, 2012

(65) Prior Publication Data
US 2012/0296769 A1 Nov. 22, 2012

Related U.S. Application Data

(60) Provisional application No. 61/488,718, filed on May 21, 2011.

(51) Int. Cl.
*G06Q 20/00* (2012.01)
*G06Q 10/08* (2012.01)
*G06Q 10/00* (2012.01)

(52) U.S. Cl.
CPC .................................. *G06Q 10/087* (2013.01)

(58) Field of Classification Search
CPC .... G06Q 10/087; G06Q 20/203; G06Q 10/08; G06Q 10/0875; G06Q 10/06
USPC .......................................................... 705/28
See application file for complete search history.

(56) References Cited

U.S. PATENT DOCUMENTS

| | | | |
|---|---|---|---|
| 7,402,282 B2 | 7/2008 | LaCourt et al. | |
| 7,672,878 B2 | 3/2010 | Katou et al. | |
| 7,855,084 B2 | 12/2010 | Jakubowicz et al. | |
| 7,958,004 B2 | 6/2011 | Dance et al. | |
| 8,103,560 B2 | 1/2012 | Ohno et al. | |
| 2002/0082957 A1 | 6/2002 | Krassi | |
| 2004/0181467 A1* | 9/2004 | Raiyani | G06Q 10/087 705/28 |
| 2005/0075954 A1 | 4/2005 | Matsumoto et al. | |
| 2005/0102166 A1 | 5/2005 | Tohma | |
| 2009/0281930 A1 | 11/2009 | Sakagami | |
| 2010/0161345 A1 | 6/2010 | Cain et al. | |

(Continued)

FOREIGN PATENT DOCUMENTS

| | | |
|---|---|---|
| CN | 101589310 A | 11/2009 |
| EP | 2 107 378 A1 | 10/2009 |

(Continued)

OTHER PUBLICATIONS

Extended European Search report for EP Application No. 12 16 8757.8; dated Aug. 30, 2012; 6 pages.

(Continued)

*Primary Examiner* — Garcia Ade
(74) *Attorney, Agent, or Firm* — Barclay Damon, LLP

(57) ABSTRACT

An order management system including a server including a processor, a network interface for communicating with at least one medical device having an associated plurality of consumables, data storage means for storing relationship information for each consumable, current inventory for each consumable, usage history for each consumable, and an order management module including program instructions that, when executed by the processor, are configured to calculate consumable order information based on the relationship information, current inventory, and usage history for each consumable.

7 Claims, 20 Drawing Sheets

(56) References Cited

U.S. PATENT DOCUMENTS

| | | | | |
|---|---|---|---|---|
| 2011/0125615 A1* | 5/2011 | Shirbabadi | ............ | G06Q 10/00 705/28 |
| 2012/0078673 A1* | 3/2012 | Koke | .................... | G06Q 10/06 705/7.13 |
| 2012/0137117 A1* | 5/2012 | Bosch et al. | ...................... | 713/2 |

FOREIGN PATENT DOCUMENTS

| | | |
|---|---|---|
| JP | 2002-318840 | 10/2002 |
| JP | 2005-112499 | 4/2005 |
| JP | 2008-003694 | 1/2008 |
| JP | 2009-143660 | 7/2009 |
| JP | 2011-073883 | 4/2011 |
| WO | WO 02/19193 A1 | 3/2002 |

OTHER PUBLICATIONS

Official Journal of the European Patent Office; vol. 30, No. 11; Nov. 1, 2007; XP007905525; pp. 592-593 (2 pages).
Russian Office Action for RU 2012120667; dated Feb. 15, 2017; 12 pages.
European Examination Report for EP 12 168 757.8; dated Oct. 29, 2015; 4 pages.
Russian Office Action for RU 2012120667; dated Feb. 20, 2016; 9 pages.
Japanese Office Action for JP 2012-114380; dated May 17, 2016; 4 pages.
Chinese Office Action for CN 201210319636.3; dated Jun. 1, 2016; 15 pages.
Russian Office Action for RU 2012120667; dated Sep. 27, 2016; 10 pages.
Chinese Office Action for CN 201210319636.3; dated Jun. 7, 2017; 15 pages.

* cited by examiner

Product    Organization    Site    User

OrthoPlus Inventory Management>Product

Catalog Number: 6801704                                    Item Description: CAL KIT 20 box/1 set/5btls
Short Name: CalKit20                                                              202 → Save | Cancel ┌─Product Information──────────────────────────┐  ┌─Cals──────────────────────────────────┐
│ Item Description: [Calibrator Kit 20 (Cs,C4,IgA,IgG and  │  │ Days Between Uses (Cals):              │
│ Internal:                                    │  │ Default    Min        Max              │
│ Product Group: [Calibrators ▼]               │  │ [182]      [1]        [182]            │
│ Sales Unit Size: [1]                         │  │ Cals per Sales Unit                    │
│ Active: ☑                                    │  │ Default    Min        Max              │
└──────────────────────────────────────────────┘  │ [1]        [1]        [2]              │
┌─Product Dependencies─────────────────────────┐  │ Cals per day                           │
│                  ☐ All Reagents, OR          │  │ Default    Min        Max              │
│ Product Dependencies:                        │  │ [1]        [1]        [3]              │
│ [6801732;6801733;6801734;6801735;6801736] ◄► │  │ Hedge Quantity:  Min        Max        │
│ Cal Reagent Dependencies: [              ]   │  │                  [1]        [2]        │
└──────────────────────────────────────────────┘  └────────────────────────────────────────┘
┌─Order Setup──────────────────────────────────┐  ┌─Yield─────────────────────────────────┐
│ Time-to-Order Trigger: [Fixed Order Cycle (Default) ▼] │  │ Yield per Sales Unit:                  │
│ Order Group: [Normal ▼]                      │  │ Default    Min        Max              │
└──────────────────────────────────────────────┘  │            [ ]        [ ]              │
┌─Product Type Settings────────────────────────┐  └────────────────────────────────────────┘
│ Calculation Type: [CalibratorWOSpacing ▼]    │  ┌─Inventory─────────────────────────────┐
│ Column Header Type: [Calibrator ▼]           │  │                      Min        Max   │
│ Inventory Calculation Type: [NonLotMatched ▼]│  │ Beginning Inv:       [0.00]     [50.00]│
│ Inventory Col Header Type: [NonLotMatched ▼] │  │ Inv Adjustment:      Min        Max   │
└──────────────────────────────────────────────┘  │                      [ ]        [10.00]│
┌─Usage Adjustments────────────────────────────┐  │ Inv Percent Adjustment Threshold:      │
│ Min                  Max                     │  │ Inv Expresses in Number of Sales Units: [Yes ▼] │
│ [-100.00]            [100.00]                │  └────────────────────────────────────────┘
└──────────────────────────────────────────────┘  ┌─Order Qty Adjustments─────────────────┐
┌─Open Stability───────────────────────────────┐  │ Min                  Max              │
│ Open Stability (In Days): [28]               │  │ [ ]                  [10.00]          │
└──────────────────────────────────────────────┘  └────────────────────────────────────────┘
┌─Other Settings───────────────────────────────┐
│ Related Condition Code                       │
│ Keep Perpetual Inventory: [Yes ▼]            │
└──────────────────────────────────────────────┘
┌─Reagent Colors───────────────────────────────┐
│ Background:                                  │
│ Foreground:                                  │
└──────────────────────────────────────────────┘

| | | | | | | |
|---|---|---|---|---|---|---|
| Product | | | | | | |
| OrthoPlus/Inventory Management>Predict | | | | | | |
| | 304 Organization | Site | User | | | |
| | 306 | 302 | | | | |
| | 6801995 | COCAINE METABOLITE RGT BX/300T | COCM Reagent -- 300 Tests | COCM | Reagents | 6 | ColHeadUsage | CalcTyp |
| | 1074053 | CORTISOL 100 wells | Cortisol Reagent Pack -- 100 Wells | Cort | Reagents | 1 | ColHeadUsage | CalcTyp |
| | 1681543 | CORTISOL CAL box/3 sets | Cortisol Calibrators -- 3 Sets / Bob | CortCal | Calibrators | 1 | ColHeadCalibrator | CalcTyp |
| | 6800874 | CORTISOL RNG VER box/2sets | Cortisol Range Verifiers -- 2 Sets / Box | CortRV | Verifiers | 2 | ColHeadRangeVerifier | CalcTyp |
| | 6892382 | CRBM/5 PACK/90 SLDS | CRBM Slides -- 90 Count | CRBM | Reagents | 5 | ColHeadUsage | CalcTyp |
| | 6802584 | CREATININE/IDMS STD/SPK/300SLD | CREA Slides (IDMS) -- 300 Count | CREA | Reagents | 5 | ColHeadUsage | CalcTyp |
| | 8936049 | CRP PERF VERIFIER I BX/6 SETS | CRP Performance Verifier I -- 6 Vials | CRPPV1 | Controls | 6 | ColHeadControl | CalcTyp |
| | 8597452 | CRP PERF VERIFIER II BX/6 SETS | CRP Performance Verifier II -- 6 Vials | CRPPV2 | Controls | 6 | ColHeadControl | CalcTyp |
| | 1926740 | CRP/S PACK/250 SLDS | CRP Slides -- 250 Count | CRP | Reagents | 5 | ColHeadUsage | CalcTyp |
| | 8097990 | CRP/S PACK/90 SLDS | CRP Slides -- 90 Count | CRP | Reagents | 5 | ColHeadUsage | CalcTyp |
| | 8208431 | CSF PROTEIN/S PACK/90 SLDS | PROT Slides -- 90 Count | PROT | Reagents | 4 | ColHeadUsage | CalcTyp |
| | 6802314 | d%A1c REAGENT BOX/300T | d%A1c Reagent Kit -- 300 Tests | d%A1c | Controls | 6 | ColHeadControl | CalcTyp |
| | 6802327 | DAT PERF VER I box/6 btls | DAT Performance Verifiers I -- 6 Bottles | DATPV1 | Controls | 6 | ColHeadControl | CalcTyp |
| | 6802328 | DAT PERF VER II box/6 btls | DAT Performance Verifiers II -- 6 Bottles | DATPV2 | Controls | 6 | ColHeadControl | CalcTyp |
| | 6802329 | DAT PERF VER III box/6 btls | DAT Performance Verifiers III -- 6 Bottles | DATPV3 | Controls | 6 | ColHeadControl | CalcTyp |
| | 6802330 | DAT PERF VER IV box/6 btls | DAT Performance Verifiers IV -- 6 Bottles | DATPV4 | Controls | 6 | ColHeadControl | CalcTyp |
| | 6802331 | DAT PERF VER V box/6 btls | DAT Performance Verifiers V -- 6 Bottles | DATPV5 | Controls | 6 | ColHeadControl | CalcTyp |

Home    Order Templates    Inv. Mgmt. Admin    Reports and Graphs    User Guide

Planning Bucket Wizard

Step 1 of 7 – Planning Bucket Wizard Overview and Instructions    404

Welcome to the Monthly Spend Calibration "Planning Bucket" Wizard. It is designed to help you forecast monthly reagent and consumable spend, in addition to targeting calibration frequency. The system plans reagent and consumable purchases forecasting. For reagents in particular, the system is set-up to logically group reagent purchase timing for those assays sharing aa common calibrator, known as a "cal group". Once you advance through the steps described below, the wizard will create one or more "Planning Buckets". Each bucket represents a shopping basket of products you will order together on the same first order date and at your preferred re-order frequency.

The wizard will guide you through the following steps:

- Step 2 – Ship To Site Selection
  Select the order ship to location which you are creating "Planning Buckets" for.

- Step 3 – Select SKU Average Daily Use Source Selection
  Elect whether to use e-Connectivity® average daily useage history or whether to enter manual average daily usage rates by SKU.

- Step 4 – Preview SKU Average Daily Use
  Review the e-Connectivity® generated average daily usage history, enter manual average daily usage rates or view previously stored manual average daily rate by SKU.

- Step 5 – Establish Planning Bucket Order Frequency
  Enter the initial order month and re-order frequency for each "cal group" and for consumables. Cal group with equal initial order months and re-order frequency will roll-up into a planning bucket.

- Step 6 – Balance Monthly Planned Spending and Calibrations
  Balance monthly planned spending calibrations by moving select "cal groups" between months.

- Step 7 – Create the Planning Buckets
  Specify the exact order day in the month for each Planning Bucket, name the Planning Buckets and create the Planning Buckets.

This wizard can be used to help re-align the order groups, based on changes to your assay menu, test volumes, target calibration frequency or budgetary priorities.

402    Next

Home    Order Templates    Inv. Mgmt. Admin    Reports and Graphs    User Guide

Planning Bucket Wizard for    MEDICAL CENTER — 5 Planning Bucket(s) Exist

Step 4 of 7 — Preview SKU Average Daily Use

| Reagents | | |
|---|---|---|
| ACET – 1037274 | Usage | 0.081 |
| AFP – 6800784 | Usage | 0.044 |
| aHBc – 6801428 | Usage | 0.121 |
| aHBs – 6801925 | Usage | 0.099 |
| aHCV – 6801325 | Usage | 0.132 |
| aHIV – 6801861 | Usage | 0.00 |
| ALB – 8196057 | Usage | 1.429 |
| ALC – 8046872 | Usage | 0.116 |
| ALKP – 1053180 | Usage | 0.473 |
| ALT – 1655281 | Usage | 0.565 |
| AMON – 1726926 | Usage | 0.046 |
| AMYL – 120670 | Usage | 0.066 |
| AST – 8433815 | Usage | 0.495 |
| B12 – 1453489 | Usage | 0.143 |
| BuBc – 8383051 | Usage | 0.314 |

| Disposables | | |
|---|---|---|
| FSCuv – 6801422 | Usage | 0.015 |
| UD01 – 6802246 | Usage | 0.00 |
| uTips – 6801423 | Usage | 0.024 |
| Vtips – 6801715 | Usage | 2.659 |

706

704

| Other Fluids | | |
|---|---|---|
| FSDil1 – 6801752 | Usage | 0.022 |
| FSDil2 – 6801753 | Usage | 0.026 |
| FSDil3 – 6801754 | Usage | 0.029 |
| HSDA – 8430373 | Usage | 0.22 |
| HSDB – 8321200 | Usage | 0.22 |
| MaintPK – 1831312 | Usage | 0.027 |
| ReconDil – 6801874 | Usage | 0.039 |
| SR – 1072693 | Usage | 1.462 |
| UWR – 8389793 | Usage | 0.716 |

Cancel    Previous    Next    702

Home    Order Templates    Inv. Mgmt. Admin.    Reports and Graphs    User Guide Planning Bucket Wizard for    MEDICAL CENTER-5 Planning Bucket(s) Exist Step 7 of 7 – Create the Planning Buckets

| Bucket Name: | Group 1 | | Bucket Name: | Group 2 | | Bucket Name: | Group 3 | | Bucket Name: | Group 5 | | Bucket Name: | Group 4 | | Bucket Name: | Group 6 | |
|---|---|---|---|---|---|---|---|---|---|---|---|---|---|---|---|---|---|
| Work/Week: | 5 | | Work/Week: | 5 | | Work/Week: | 5 | | Work/Week: | 5 | | Work/Week: | 5 | | Work/Week: | 5 | |
| Order Cycle: | 1 Month | | Order Cycle: | 4 Month | | Order Cycle: | 4 Month | | Order Cycle: | 4 Month | | Order Cycle: | 1 Month | | Order Cycle: | 4 Month | |
| Order Cycle: Ord. | 4 Weeks | | Order Cycle: Ord. | 16 Weeks | | Order Cycle: Ord. | 16 Weeks | | Order Cycle: Ord. | 16 Weeks | | Order Cycle: Ord. | 4 Weeks | | Order Cycle: Ord. | 16 Weeks | |
| Temp. Eff. Date: | 6/14/2011 | 📅 | Temp. Eff. Date: | 7/1/2011 | 📅 | Temp. Eff. Date: | 7/1/2011 | 📅 | Temp. Eff. Date: | 7/1/2011 | 📅 | Temp. Eff. Date: | 6/1/2011 | 📅 | Temp. Eff. Date: | 10/1/2011 | 📅 |
| Short Name | Catalog No | | Short Name | Catalog No | | Short Name | Catalog No | | Short Name | Catalog No | | Short Name | Catalog No | | Short Name | Catalog No | |
| AFP | 6800784 | | B12 | 1453489 | | CalKit12 | 6801697 | | CalKit14 | 6801699 | | ALB | 8196057 | | ACET | 1037274 | |
| AFPCal | 6900663 | | B12Cal | 1540525 | | VALP | 6801710 | | TOBRA | 6801712 | | ALKP | 1053180 | | CalKit9 | 8568040 | |
| AFPRV | 6800878 | | B12RV | 6800872 | | | | | | | | ALT | 1655721 | | CRBM | 8992382 | |
| aHBc | 6801428 | | | | | | | | | | | AMYL | 1202670 | | DGXN | 8343386 | |
| aHBcCal | 6801429 | | | | | | | | | | | AST | 8433815 | | PHBR | 8221384 | |
| aHBs | 6801925 | | | | | | | | | | | BuBc | 8383051 | | PHYT | 8298671 | |
| aHBsCal | 6801926 | | | | | | | | | | | CalKit3 | 1290709 | | | | |
| aHBaQC | 6802093 | | | | | | | | | | | CalKit4 | 1204668 | | | | |
| aHCV | 6801325 | | | | | | | | | | | CK | 8479396 | | | | |
| aHCVCal | 6801326 | | | | | | | | | | | Fe | 1515808 | | | | |
| aHIV | 6801861 | | | | | | | | | | | GGT | 8057289 | | | | |
| aHIVCal | 6801862 | | | | | | | | | | | LDH | 8384489 | | | | |
| aHIVQC | 6801863 | | | | | | | | | | | UPA | 1668409 | | | | |
| AirFilt | 6801967 | | | | | | | | | | | TBIL | 8159921 | | | | |
| ALC | 8046872 | | | | | | | | | | | TP | 8392292 | | | | |

1000    1004    1006    1002

Cancel | Previous | Next

FIG. 10

Home    Order Templates    Inv. Mgmt. Admin    Reports and Graphs    User Guide

Group Re-alignment/Initial Suggested Orders                    1102

Customer Number:                       Avg. Daily Usage:
[MEDICAL CENTER ▼]                     ○ User Defined ⊙ e-Connectivity®

Group Re-alignment/Initial Suggested Orders
00003663-METHODIST MEDICAL CENTER

[Feb Jun Oct] [Monthly] [MicroWells] [Mar Jul Nov] [Apr Aug Dec]

| Category | Item Description | Catalog Number | Avg. Daily Usage | Suggested Order Qty |
|---|---|---|---|---|
| Reagents | BUN/5 PACK/300 SLDS | 6802204 | 1.16 | 0 |
| Reagents | C3 REAGENT BOX/300T | 6801735 | 0.011 | 0 |
| Reagents | C4 REAGENT BOX/300T | 6801736 | 0.016 | 0 |
| Reagents | CALCIUM/5 PACK/300 SLDS | 1450261 | 1.16 | 0 |
| Reagents | CREATININE/IDMS STD/SPK/300SLD | 6802584 | 1.226 | 0 |
| Reagents | dLDL REAGENT BOX/600T | 6801728 | 0.044 | 0 |
| Reagents | dTIBC REAGENT BOX/300T | 6802001 | 0.029 | 0 |
| Reagents | GENTAMICIN REAGENT BOX/300T | 6801711 | 0.022 | 0 |
| Reagents | GLUCOSE/5 PACK/300 SLDS | 1707801 | 1.244 | 0 |
| Reagents | HAPTOGLOBIN REAGENT BOX/300T | 6802214 | 0.016 | 0 |
| Reagents | HOMOCYSTEINE REAGENT BOX/150T | 6802002 | 0.044 | 0 |
| Reagents | hsCRP REAGENT BOX/300T | 6801739 | 0 | 0 |
| Reagents | LACTATE/5 PACK/90 SLDS | 8150112 | 0.073 | 0 |
| Reagents | LITHIUM/5 PACK/90 SLDS | 1632660 | 0.029 | 0 |
| Reagents | MAGNESIUM/5 PACK/300 SLDS | 8255093 | 0.47 | 0 |
| Reagents | mALB REAGENT BOX/300T | 6801740 | 0.04 | 0 |
| Reagents | PALB REAGENT BOX/300T | 6801741 | 0.016 | 0 |
| Reagents | PHOSPHORUS/5 PACK/300 SLDS | 1513209 | 0.721 | 0 |
| Reagents | RF REAGENT BOX/300T | 6801729 | 0.013 | 0 |
| Reagents | SALICYLATE/5 PACK/90 SLDS | 1314343 | 0.066 | 0 |
| Reagents | THEOPHYLLINE/5 PACK/90 SLDS | 1307164 | 0.033 | 0 |
| Reagents | TOBRAMYCIN REAGENT BOX/300T | 6801712 | 0.009 | 0 |
| Reagents | URIC ACID/5 PACK/300 SLDS | 1943927 | 0.013 | 0 |
| Reagents | URINE PROTEIN/5 PACK/90 SLDS | 6801720 | 0.084 | 0 |
| Reagents | VALPORIC REAGENT BOX/300T | 6801710 | 0.022 | 0 |
| Reagents | VANCOMYCIN REAGENT BOX/300T | 6801709 | 0.04 | 0 |
| Other Fluids | DILUENT PACK 1 box/3 packs | 6801752 | 0.022 | 0 |
| Other Fluids | DILUENT PACK 2 box/3 packs | 6801753 | 0.026 | 0 |
| Other Fluids | DILYENT PACK 3 box/3 packs | 6801754 | 0.029 | 0 |
| Other Fluids | RECONSTITUTION DIL box/12 btls | 6801874 | 0.039 | 0 |
| Disposables | FS CUVETTES box/6000 | 6801422 | 0.015 | 0 |
| Disposables | FS MICROTIPS box/4096 | 6801423 | 0.024 | 0 |
| Disposables | UD01 PACKS (EMPTY) BOX/6PACKS | 6802246 | 0 | 0 |

1106 → (pointing to Category column)
1104 → (pointing to Suggested Order Qty column)
1100

Note: Suggested Order Qty = (No. of working days between Template Effective Date Today + Safety Stock Days + Order to Receipt Days)*Average Daily usage Rounding of by Order Qty Rounding Factor.

Home   My Profile   Security Center   Secure Messages   Metrics

Default>Secure Messages>Assign Messaging

Assign messages you would like to receive

| Feature | Email ☒ | SMS ☺ | Message Type | Select Site for Message |
|---|---|---|---|---|
| Inventory Management | ☑ | ☐ | Order Acknowledgment | Hide Site List — Select All \| DeSelect All ☑ ┌HOSP ☑ MEDICAL CENTER ☑ CENTER |
| | ☑ | ☐ | Order Review Qty Alert | Hide Site List — Select All \| DeSelect All ☑ ┌HOSP ☑ MEDICAL CENTER ☑ CENTER |
| | ☑ | ☐ | Time To Order | Hide Site List — Select All \| DeSelect All ☑ ┌HOSP ☑ MEDICAL CENTER ☑ CENTER |
| | ☑ | ☐ | Calibration Alert | Select Sites |
| | ☑ | ☐ | Min Inventory Qty Alert | Select Sites |
| | ☑ | ☐ | e-Connectivity® Data Alert | Select Sites |
| | ☑ | ☐ | Calibrator Lot Requires Alert | Select Sites |

1504

1506

1502 — Save  Cancel

Home   My Profile   Security Center   Secure Messages   Metrics

Default>Secure Messages>Mobile Settings

Mobile Settings

Telephone Number: [_____] * [Save] [Cancel]
                       1602
Carrier: [Verizon ▾]

Send Text: ⦿ On ○ Off

What are the maximum number of texts should be sent daily?
[Unlimited ▾]

What times should texts be sent to my phone?
⦿ Anytime  ○ Only from [9:00AM ▾] to [10:00PM ▾]

*indicates a required field

SYSTEM AND METHOD OF INVENTORY MANAGEMENT

CROSS REFERENCE TO RELATED APPLICATIONS

This application is based upon a provisional patent application, U.S. Ser. No. 61/488,718, filed May 21, 2011, pursuant to relevant sections of 35 USC §119, the entire contents of which is herein incorporated by reference.

TECHNICAL FIELD

The present invention relates to inventory and order management systems particularly in the medical field and even more particularly with respect to clinical analyzers and associated consumable products.

BACKGROUND INFORMATION

Medical devices including clinical analyzers used in diagnostic laboratories use large amounts of consumable products such as chemical reagents, calibrators, and other fluids when performing immunological and/or biochemical tests on blood, urine, tissue, and other human body samples. The performance of these tests within a limited time is often critical to determining a person's health. The performance of these tests within allotted schedules are often impacted by the non-availability of the necessary reagents and other consumable products required for these tests. Hence, it is extremely important the laboratories have on hand the consumables required to perform the tests.

Some laboratories keep large amounts of consumables on hand and make periodic orders, such as monthly or bimonthly orders, to replenish their stock. This manner of tracking and ordering consumables may be extremely inefficient, as the laboratory may be faced with having a large stock of reagents that are only infrequently used, while the stock of the more frequently used reagents may be depleted before a new order is made, for example. Space constraints, reagent expiration, and cost balancing may not be adequately addressed by such an inventory management system.

Other laboratories utilize a manual inventory process in order to track the usage of consumables. This process involves at least one person checking to see what reagents are present on the shelves that are used to stock the reagent inventory. However, since this process requires manual verification and tracking of inventory, the process is labor-intensive and it is likely that mistakes will be made as to the quantities of reagents on hand. These mistakes are also more likely to occur when the laboratory is extremely busy, such that shortages of certain critical reagents will be overlooked. Such shortages of critical reagents will likely result in delays to critical tests.

While some laboratories automate their ordering process, prior art order management systems often automatically submit orders as each consumable reaches a threshold inventory level. Such an automated process results in successive small orders, inadequate to meet minimum cold storage transport requirements, and associated issues including time and expense submitting and tracking a large number of frequent orders. Further, these ordering processes do not allow for order scheduling, order planning, or cost balancing.

Thus, there exists a need in the art for a consumable inventory and order management system for medical devices providing for increased efficiency of notification of threshold consumable levels as well as automated ordering of consumable products to efficiently schedule purchases and balance spending.

BRIEF DESCRIPTION OF THE DRAWINGS

The present invention is disclosed with reference to the accompanying drawings, wherein:

FIG. 2 is a screen shot illustrating an exemplary administrative consumable product setup page;

FIG. 3 is a screen shot illustrating an exemplary administrative consumable product display page;

FIG. 4 is a screen shot illustrating an exemplary system introductory content page;

FIG. 7 is a screen shot illustrating an exemplary average daily use preview and manual input page;

FIG. 8 is a screen shot illustrating an exemplary consumable order scheduling page;

FIG. 9A is a screen shot illustrating an exemplary periodic order schedule page including cost and calibrator groups;

FIG. 9B is a screen shot illustrating an exemplary periodic order schedule page including cost and exemplary consumables associated with a calibrator group;

FIG. 9C is a screen shot illustrating an exemplary periodic order schedule page including manual scheduling of a calibrator group;

FIG. 10 is a screen shot illustrating an exemplary order group creation page;

FIG. 11 is a screen shot illustrating an exemplary realignment order page;

FIG. 12 is a screen shot illustrating an exemplary order template page;

FIG. 15 is a screen shot illustrating an exemplary customer message selection page;

FIG. 16 is a screen shot illustrating an exemplary customer mobile settings page;

FIG. 17 is a screen shot illustrating an exemplary administrator message type selection page; and FIG. 18 is a screen shot illustrating an exemplary inventory display page.

DETAILED DESCRIPTION

Figure 1:
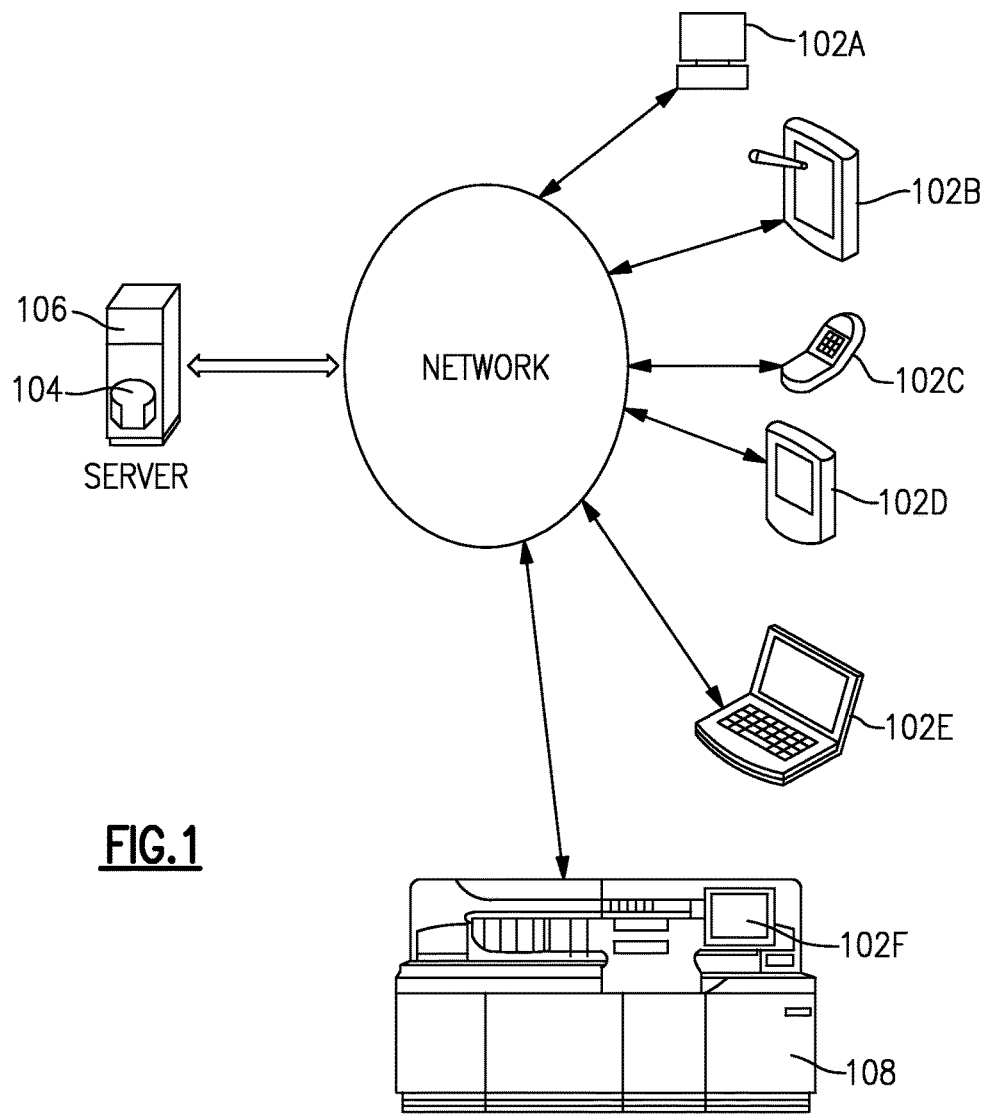
FIG. 1 is an exemplary inventory management system framework.

Referring to FIG. 1, the framework of some embodiments of the inventory management systems and methods of the present invention can be implemented by a client/server architecture utilizing remote HTTP requests from a client 102 to communicate with a server 104 which is responsible for substantially all of the processing activity. Preferably, the server includes at least a processor, or other control circuitry operative to control the operations and performance of the server, data storage means 106 such as memory, semi-permanent memory such as random access memory (RAM), one or more storage mediums including a hard-drive, solid state drive, flash memory, permanent memory such as ROM, any other suitable type of storage component, or any combination thereof, and a network interface configured to receive data from, send data to, and otherwise communicate with one or more clients 102 to display content pages on the client device 102. In some embodiments, the network is a wide area network such as the Internet and the server is a web server. However, in other embodiments the network can be a local area network, virtual private network, or any other type of communications infrastructure. In a preferred embodiment, the server is a web server having a hard disc data storage means storing executable code that is configured to operate over the Internet in communication with the processor of a web-enabled client 102 to display various web pages of the system on the client device 102.

The plurality of client devices 102 can be any electronic device including a processor, data storage means, a display, a user interface device, and a network interface configured to communicate over a network with the server such as a desktop personal computer 102A, tablet personal computer 102B, cellular telephone or smart phone 102C, personal digital assistant 102D, laptop personal computer 102E, and computing device 102F attached to and/or in direct communication with a medical device, for example.

The server is further configured to communicate with a medical device utilizing a plurality of consumables and having at least a processor and data storage means, and a network interface. While the present invention is described with respect to a main frame clinical analyzer 108, other devices utilizing consumables are contemplated.

Clinical analyzers are generally known in the art as "dry analyzers," "wet analyzers," or "combinational analyzers". Dry analyzer systems typically include a sample supply which includes a number of sample containers, a metering/transport mechanism, and an incubator having a plurality of test read stations. A quantity of sample is aspirated from the sample supply initially into a metering tip using a proboscis or probe that is carried by a movable metering truck along a transport rail. A quantity of sample from the tip is then metered (dispensed) onto a dry slide element which is loaded into a receiving station of the incubator. The slide element is then incubated and optical, potentiometric and/or other reads are taken for analyte detection. The dry slide elements are then discarded.

Wet analyzers generally utilize a reaction vessel such as a cuvette, into which quantities of patient sample, at least one reagent fluid, and/or other fluids are combined for conducting an assay. The cuvette is also incubated and tests are conducted for analyte detection. The wet analyzer system further includes a metering mechanism to transport patient sample fluid from a sample supply to the reaction vessel. As one example of analyzer operation, calibrators are utilized to provide a baseline analysis result to be compared with subsequent tests on human samples utilizing one or more associated reagents. A variety of assays can be produced, depending on the analyte of interest. More detailed specifications and analyzer operational information is disclosed in U.S. Pat. Nos. 7,855,084 and 7,402,282 which are incorporated herein by reference, for example, and exemplary clinical analyzer products are the Vitros™ line of clinical analyzers that are commercially available from Ortho-Clinical Diagnostics, Inc.

Irrespective of type, but particularly with respect to the wet type, clinical analyzers are generally configured to perform tests on human samples through the use of a plurality of consumables including calibrators, reagents, controls, verifiers, fluids, tips, and other consumables and/or disposable products. Preferably, clinical analyzers 108 using the inventory management system of the present invention are configured to monitor the level of at least some consumable products on-board the analyzer 108 through one or more sensors such as RFID, optical, capacitive, pressure, and/or bar code reading sensors, as well as software methods which associate various operations and/or tests of the analyzer 108 with predetermined amounts of the consumables required to perform each test. Consumable inventory levels can be maintained in local data storage means 102F on-board the analyzer or periodically communicated by an analyzer network interface to a server or host electronic device, for example.

The server 104 of the present invention is preferably an Internet-accessible server 104 including a plurality of static and dynamically created web page documents configured to communicate with a database stored in the data storage means 106. At least one web page provides a portal for users, having at least one level of either administrative or customer privileges as stored in the database and as maintained by one or more users with such a level of administrative privileges such as commonly referred to as a system administrator. The content of at least some of the web pages is determined by permissions/privileges, user type (customer or administrator), and/or the specific user associated with a secure login name and password provided by a system administrator and as stored in the database. Along with setting customer privileges, administrators of the system can populate the database with analyzer site installations as associated with a customer and, consumable information including name, catalog number, price, type, and description, among other parameters, as discussed in more detail below.

More specifically and referring to FIG. 2, a screen shot illustrating an exemplary administrative consumable product setup page 200 is shown. At least one administrator can establish, using a plurality of selectable elements on the consumable product setup page 200, the plurality or universe of consumable products associated with the system. Accordingly, the administrator can select a plurality of parameters including item description, type, product group, sales unit size, as well as default usage information such as days between calibrations, yield, and beginning inventory level, for example, and thereby establish, upon submission such as user interaction with a button or link 202, an entry in a table of the database for each consumable product. Significantly, the consumable product setup page 200 further provides for submission to the database of product dependencies 204 which establish relationships among consumables such as between each reagents at least one calibrator, for example, as described below.

Referring to FIG. 3, a screen shot illustrating an exemplary administrative consumable product display page 300 is shown. The content of the consumable product display page 300 is dynamically generated from the database as populated by administrator interaction with the consumable product setup page 200, among other pages, as described above. Accordingly, while the consumable product setup page 200 can be utilized to establish the universe of consumables stored in the database, the consumable product display page 300 can be utilized to select only certain consumables 302 to be displayed to the customers as available for purchase, as described in detail below. In order to establish available consumables 302, the administrator can select or deselect using check-boxes 304, for example, each consumable 300 and submit or save the selections which stores the information in the database as an attribute in a table entry for each consumable 300, for example. Moreover, the system is configured to allow an administrator to efficiently return to the consumable product setup page 200 to modify one or more parameters of the consumable product database entry using a button or icon link 306 to that page 200.

Referring to FIG. 4, a screen shot illustrating an exemplary inventory management system introductory content page 400 is shown having an explanation of the steps of the system and a means for allowing the customer to continue such as a next button. The introductory content page 400 is accessible at least by customers of the system having at least one level of customer privileges as associated with their secure login in one or more tables in the database, for example. The inventory management system can be implemented as executable code, in which case the introductory screen display can be a web page of a browser, or a content page or frame of a rich Internet application, for example. The next button 402 can be linked to another web or content page of the system such that engagement with the button 402 or hyperlink by a customer through a user interface device such as a mouse, trackball, or keyboard for example, will load, or cause to be displayed on a client device 102, another page of the system either in place of the introductory content page, as an overlay, or in a new browser window. Similarly, other relevant links or tabs 404 may be associated with the introductory content page 400 as shown in FIG. 4 to provide users with an efficient means of navigating of the system.

Figure 5:
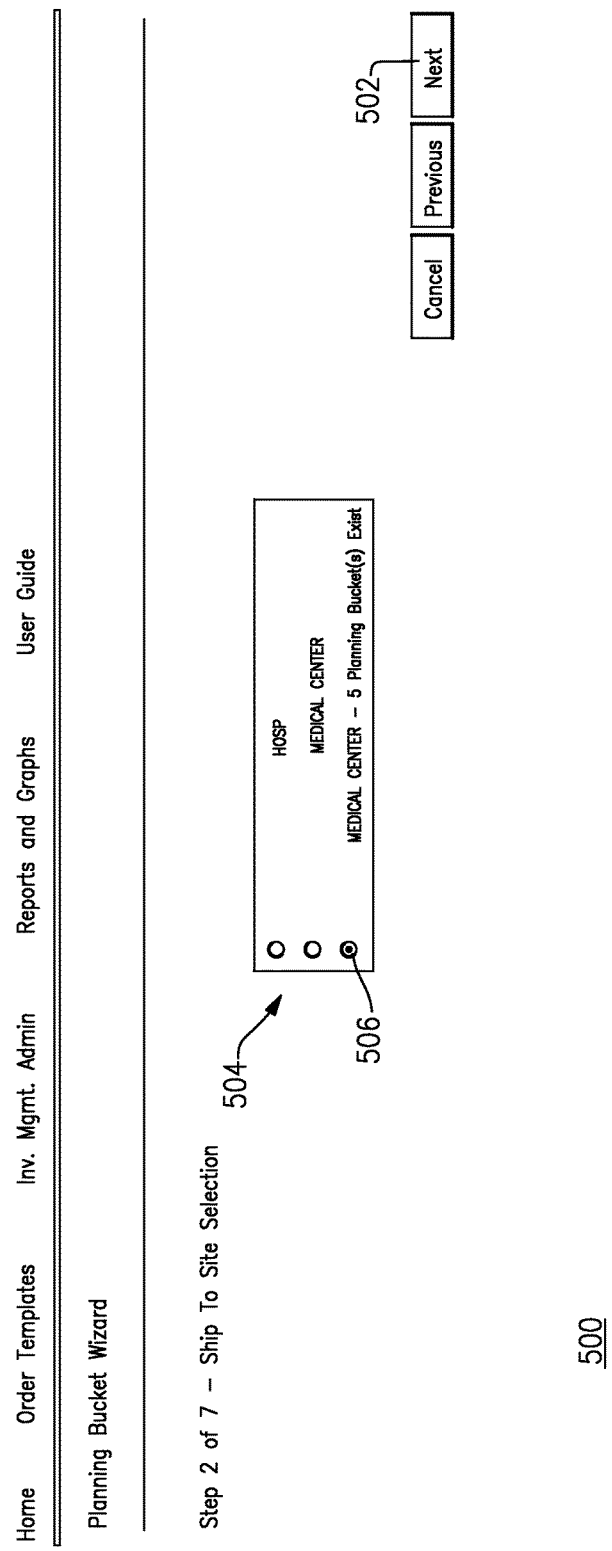
FIG. 5 is a screen shot illustrating an exemplary site selection page.

Selecting a button, such as a next button 402 shown in FIG. 4, causes a site selection page 500 to be displayed to the customer, an example of which is shown in FIG. 5. Preferably, the database includes one or more tables linking each customer's secured login information with one or more sites or analyzer installations, as entered either by an administrator or a customer upon registering with the system. Accordingly, each site 502 associated with the customer can be displayed in a site selection page 500 and one site for which the customer intends to manage consumable inventory using the system can be selected by engagement of a user interface device with a button, such as the radio button 506 shown, or a link, for example.

Figure 6:
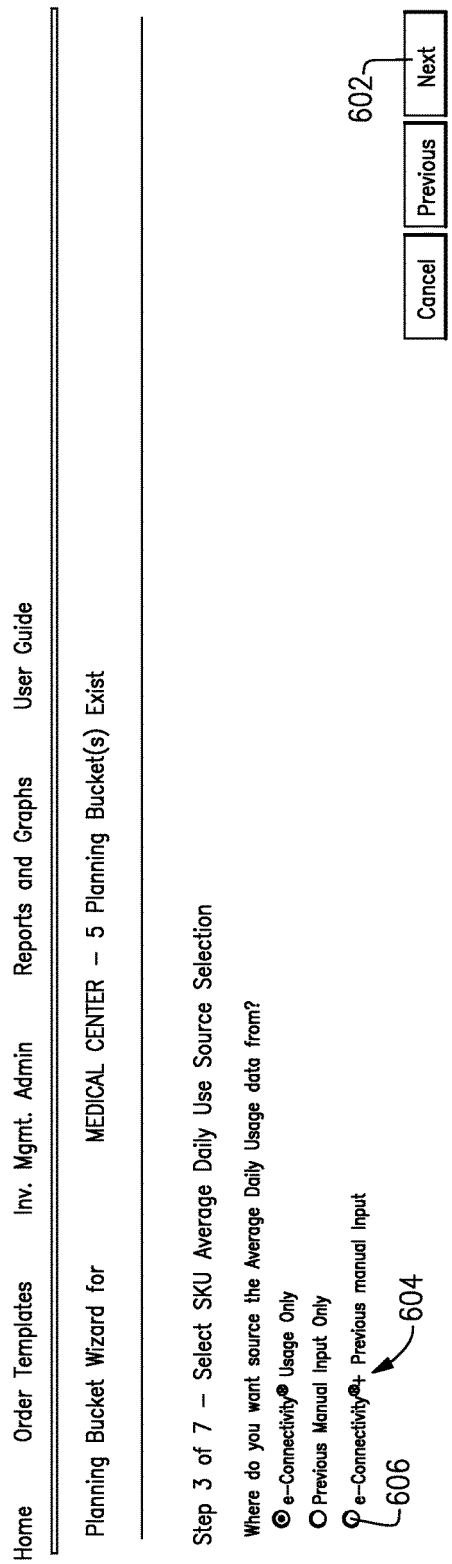
FIG. 6 is a screen shot illustrating an exemplary average daily use source selection page.

While the customer can cancel or navigate to the previous content page by engaging one or more buttons, for example, selecting the next button 502 causes an average daily use source selection page 600 to be displayed to the customer, an example of which is shown in FIG. 6. As described above, in some preferred embodiments, the clinical analyzer 108 is in communication with a server 104 over a network and, accordingly, the server 104 is able to retrieve consumable product usage data as monitored by a plurality of sensors on-board the analyzer 108, and/or executable code configured to store at least operational history, stored locally in data storage means on-board the analyzer 108 and/or in the data storage means 106 of the server 104. Accordingly, the average daily use source selection page 600 allows a customer to select whether the source of the average daily use data 604 to be used subsequently during the operation of the system is the data received by the server 104 through continuous or periodic monitoring of the analyzer 108 at the selected site, data manually input by the customer, or a combination of both sources. Once the data source 604 is selected by customer engagement with the appropriate radio button 606 or link, the customer can proceed to select the next button 602 causing an average daily use preview and manual input page 700 to be displayed, an example of which is shown in FIG. 7.

Figure 8:
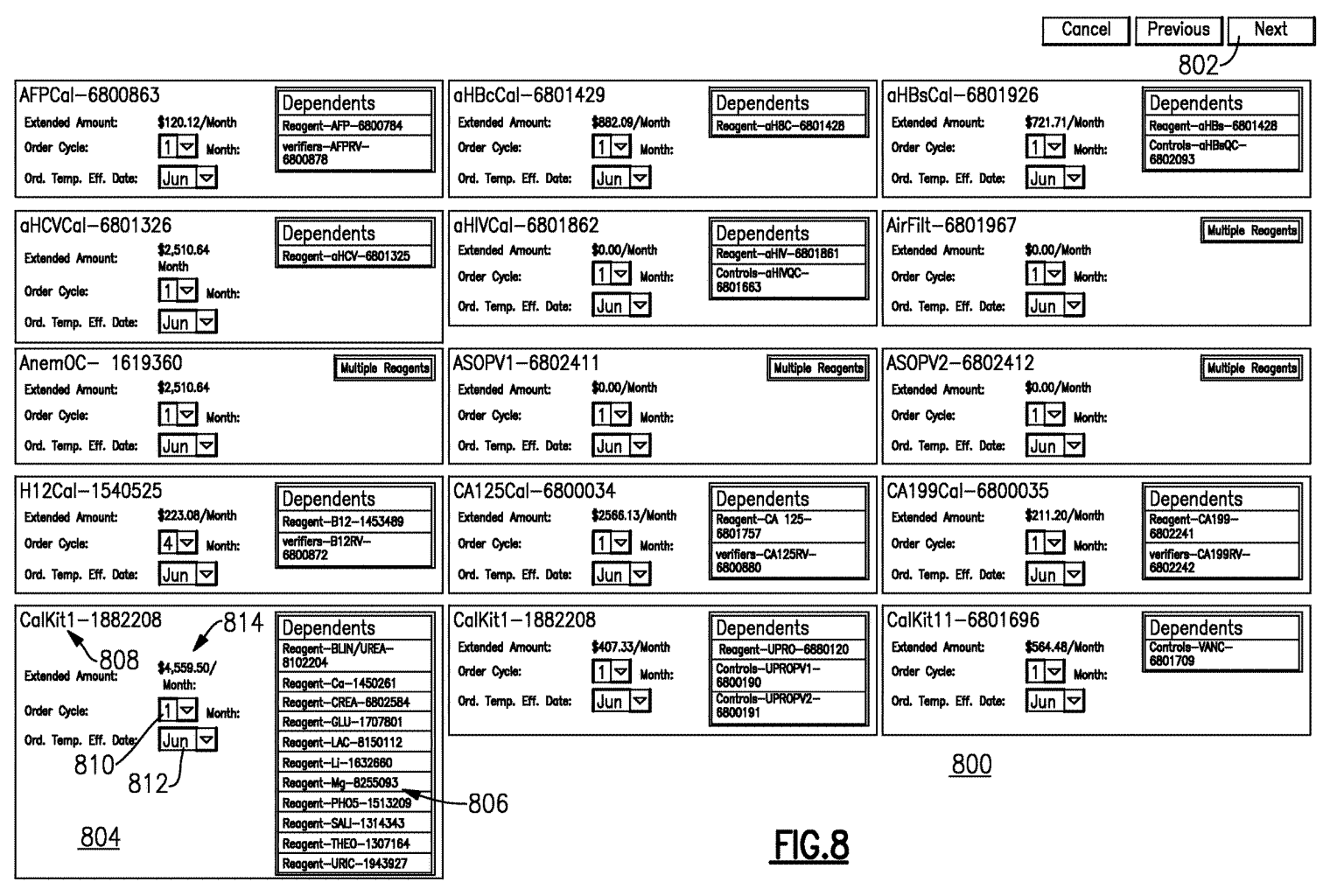

The exemplary average daily use preview and manual input page 700 of FIG. 7 shows various consumables including reagents, disposables, and other fluids, as associated with their respective average daily use as determined using data stored in the database and as retrieved through network communication of the server 104 with the analyzer 108 over a specified period of time. Because the customer selected "e-Connectivity® Usage Only" in the exemplary operation shown in FIG. 6, the data displayed to the customer on the average daily use preview and manual input page 700 is pre-populated with the retrieved data. However, the usage data can be provided in an one or more editable text boxes 706 as shown in FIG. 7 to allow manual input and/or modification of the average daily usage values for the plurality of consumables 704 utilized by the selected analyzer 108, and specifically those consumables 704 that are not monitored by on-board sensors or by software methods. Once satisfied with the accuracy of the displayed average daily usage rates, the customer can engage the next button 702 to proceed to a consumable order scheduling page 800, an example of which is shown in FIG. 8.

Based on the analyzer's 108 operational and historical usage of consumables, as monitored by the server and stored in the database or manually entered by a customer, the system is configured to display one or more consumable groups 804 based on a shared characteristics such as, in the example shown, reagents 806 and a shared calibrator 808. Accordingly, each calibrator 808 displayed to the customer has a plurality of dependents 806, as previously associated in a table in the database by an administrator as described above with respect to FIGS. 2-3, including reagents, verifiers, and controls, for example. According to this exemplary embodiments, two drop down menus are provided, one each for allowing the customer to select the order cycle 810, such as every three months for example, and the order effective date 812. Also displayed as associated with each consumable group 804 is the cost 814 of each order of the group 804. By manipulating the order cycles 810 and effective dates 812 on the consumable order scheduling page 800, the customer can effectively balance shipment size and cost while advantageously not being required to manually determine projected quantity or usage or effectuate an order for each consumable product individually.

Figure 9A:
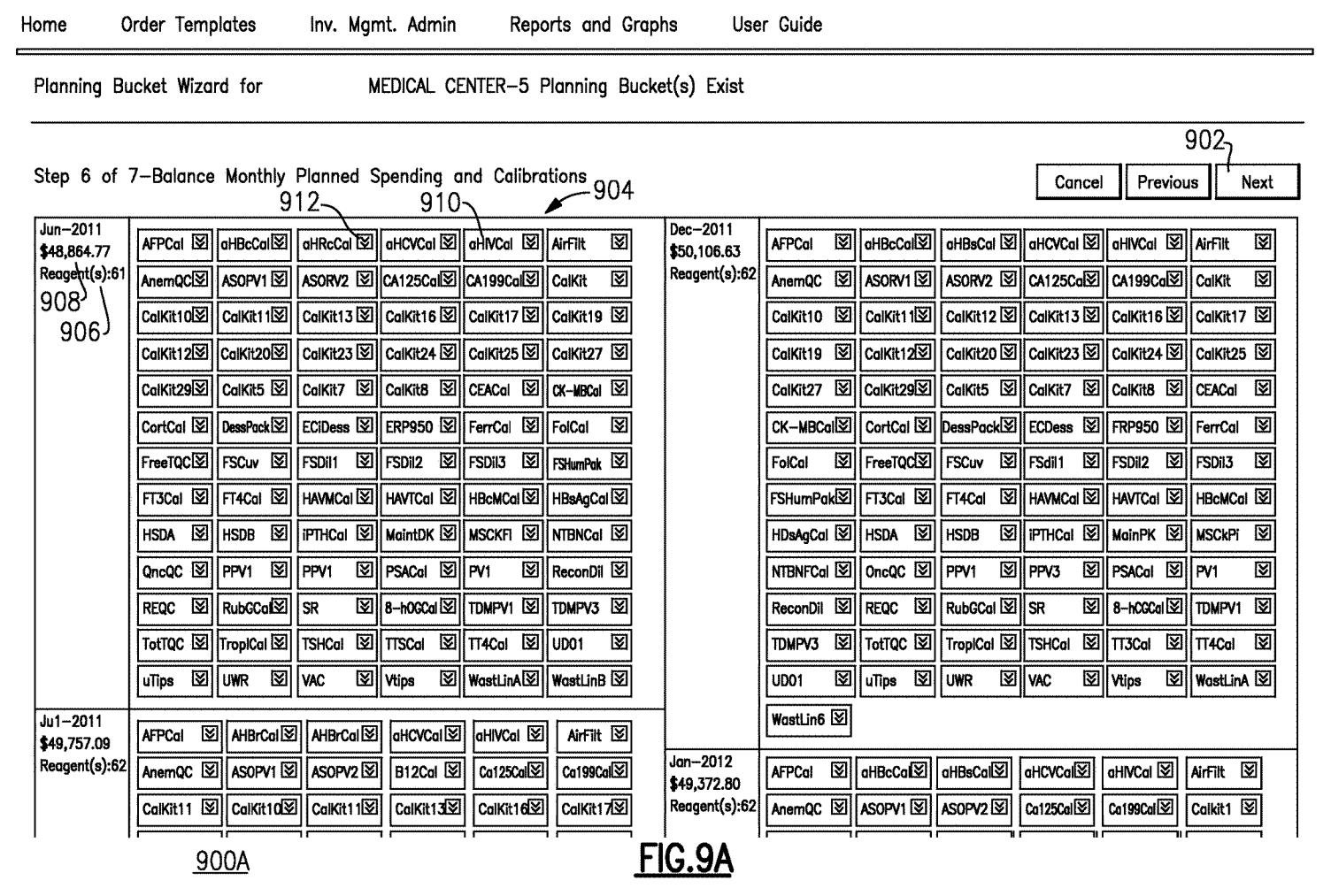
Figure 9B:
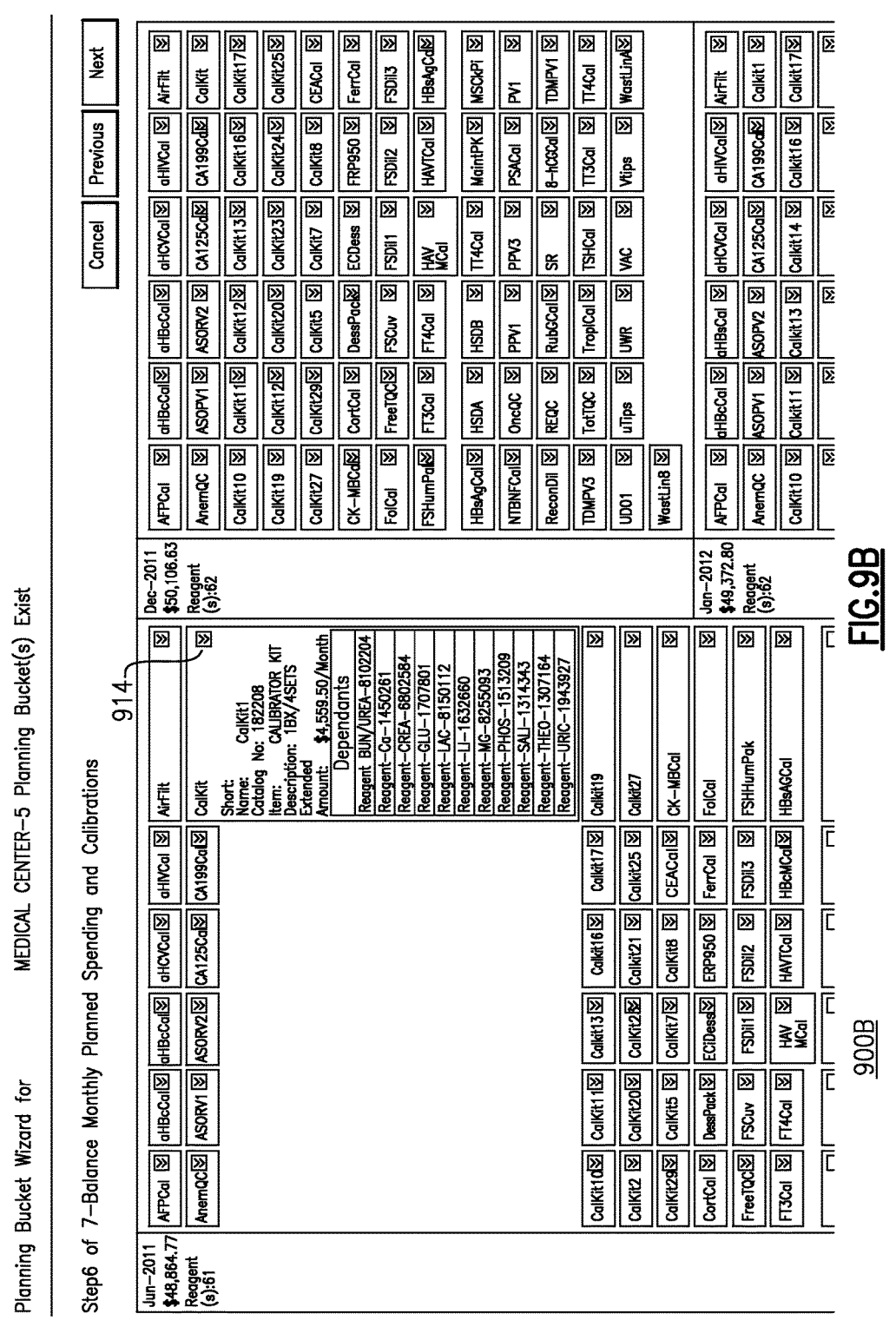
Figure 9C:
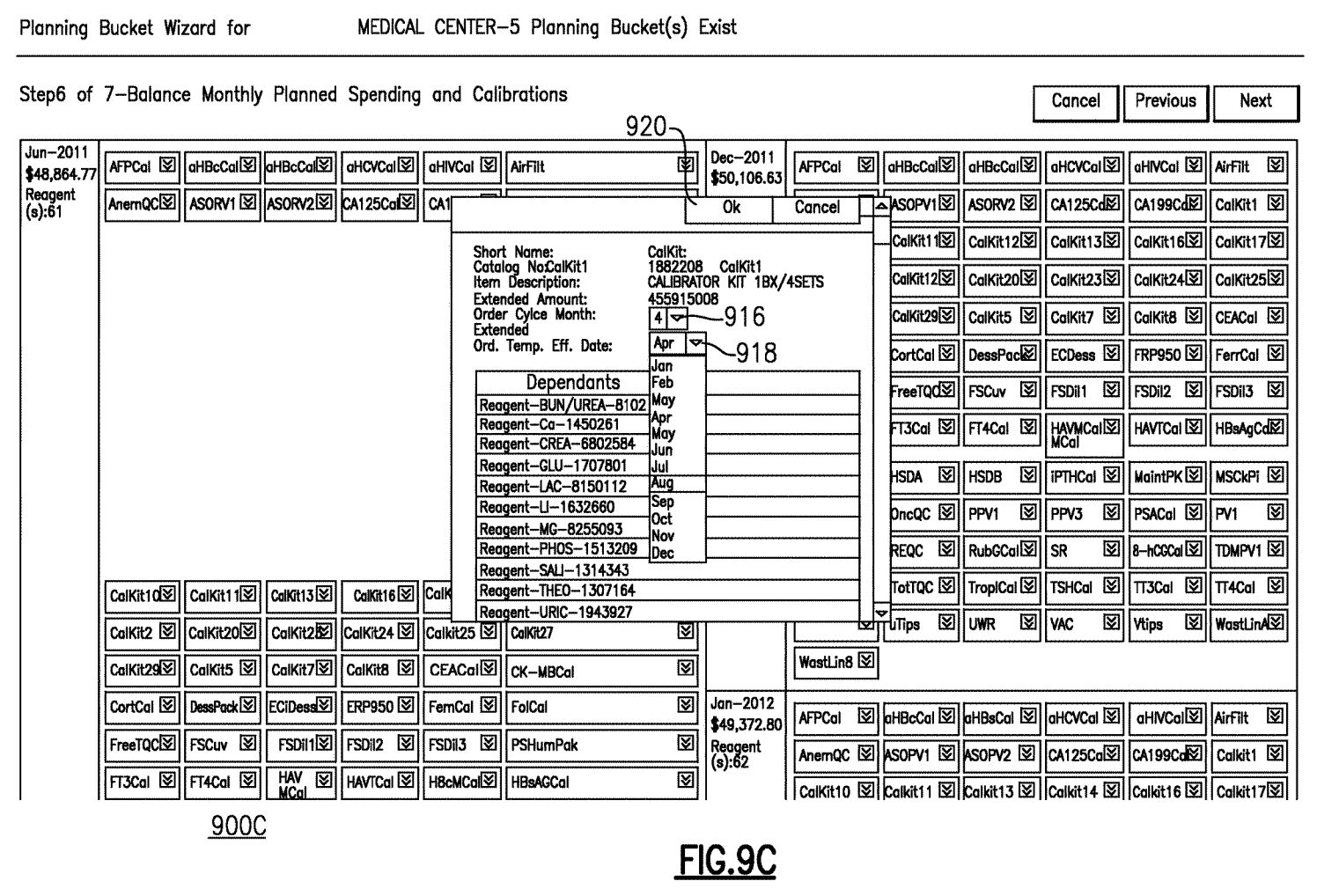

Once the customer's selections are submitted and stored in the database, by customer engagement with the next button 802 for example, a periodic order schedule page 900 including cost 908 and consumable groups 904 is displayed, an example of which is shown in FIG. 9A, which provides a forecast of projected consumable orders and spend. In the example shown in FIG. 9A, four months are provided and data including total cost 908 and number of reagents 906 of the currently scheduled order for each respective month is displayed. In some embodiments, each of the consumable groups 904 having a shared characteristic, such as a relationship with a calibrator as described above, are displayed as represented by the calibrator 910. Customer engagement with a link 912 associated with the calibrator group 904 causes a new content page 900B, overlay, pop-up, and/or shift in consumable group icons to be displayed, an example of which is shown in FIG. 9B. The expanded consumable group displays to the customer a plurality of parameters including name of the calibrator group, catalog number, type of item, description, cost, and associated reagents, for example. The expansion of a consumable group 904 further causes an additional icon 914 or button to be displayed that, when engaged by a customer, expands the consumable group 904 further by displaying a new content page 900C, overlap, pop-up, and/or shifting consumable group icons, an example of which is shown in FIG. 9C. In some embodiments, this further expansion displays drop-down menus 916, 918 corresponding to those described above 810, 812 with respect to the exemplary consumable order scheduling page 800 shown in FIG. 8. Accordingly, by manipulation of the drop-down menus 916, 918, the customer can modify the order cycle and effective month and submit the selections by engaging a button 920, for example. Upon engagement of the button 920, the extended display is removed and the display returns to the content page 900A shown in FIG. 9A. Preferably, the submitted selections are stored at least temporarily and/or in the database such that upon removal of the extended display from the customer's display, the cost 908 associated with the one or more months, as well as number of reagents 906 and location of consumable groups 904 on the display, are automatically revised according to the customer's selections, if necessary. The revisions can be displayed to the customer through the use of refreshing the page and again communicating with the database or through the use of an applet such as a Java™ applet, as is known in the art, which does not require a screen refresh. Accordingly, the pages shown in FIG. 9A-9C provide the customer with the ability to effectively schedule and forecast orders of consumable products 904 as well as balance shipment levels and consumable spend.

Upon submission of the periodic order schedule page 900, the system can display an order group or bucket creation page 1000, an example of which is shown in FIG. 10. The bucket creation page 1000 displays to the customer suggested groups of consumable groups or buckets 1004 created by arrangement of consumable groups having a shared order cycle, to be saved by the customer, such as groups 1-6 shown in FIG. 10. In order to determine quantity of consumables to be included in the order, a text box or drop-down menu 1006 is provided to allow the customer to enter the numbers of days in the work week for the analyzer 108. While the order cycle and effective date were entered previously, through customer engagement with one of the consumable order scheduling page 800 or the periodic order schedule page 900, each of these parameters can be displayed as a modifiable text box or drop-down menu editable by the customer and causing the bucket creation page to revise the display accordingly and preferably substantially in real-time. Upon customer engagement of the next button 1002, for example, the buckets 1004 and associated order attributes including work week 1006, cycle, and effective date, are stored in the database associated with the analyzer 108, installation site, and/or customer and the system can cause a login content page, the introductory content page, or any other page to be displayed preferably providing a link to a realignment order page 1100 to be displayed, an example of which is shown in FIG. 11.

The realignment order page 1100 displays a suggested order quantity 1104 calculated as the number of working days between the effective date of the order and the date the order is placed plus safety stock days (as provided as a system default or manually entered by the customer, as discussed in more detail below), plus the number of days required to receive the order after the order effective date, multiplied by the average daily usage, as stored in the database such as displayed by the average daily use preview and manual input page, and rounded by an order rounding factor provided as a system default or manually entered by the customer, also as discussed in more detail below. Accordingly, upon customer engagement with a run button 1102, for example, the system is configured to calculate suggested order quantity 1104 for one or more consumables 1106 associated with orders of a specified cycle, for example, and replace the order quantity values in the data storage means with the calculated values. Accordingly, the realignment process of the system accounts for consumable inventory used between the order date with associated beginning inventory values and order effective date as well as time spent during shipment, to ensure uninterrupted supply of consumables and associated analyzer 108 operation.

Figure 12:
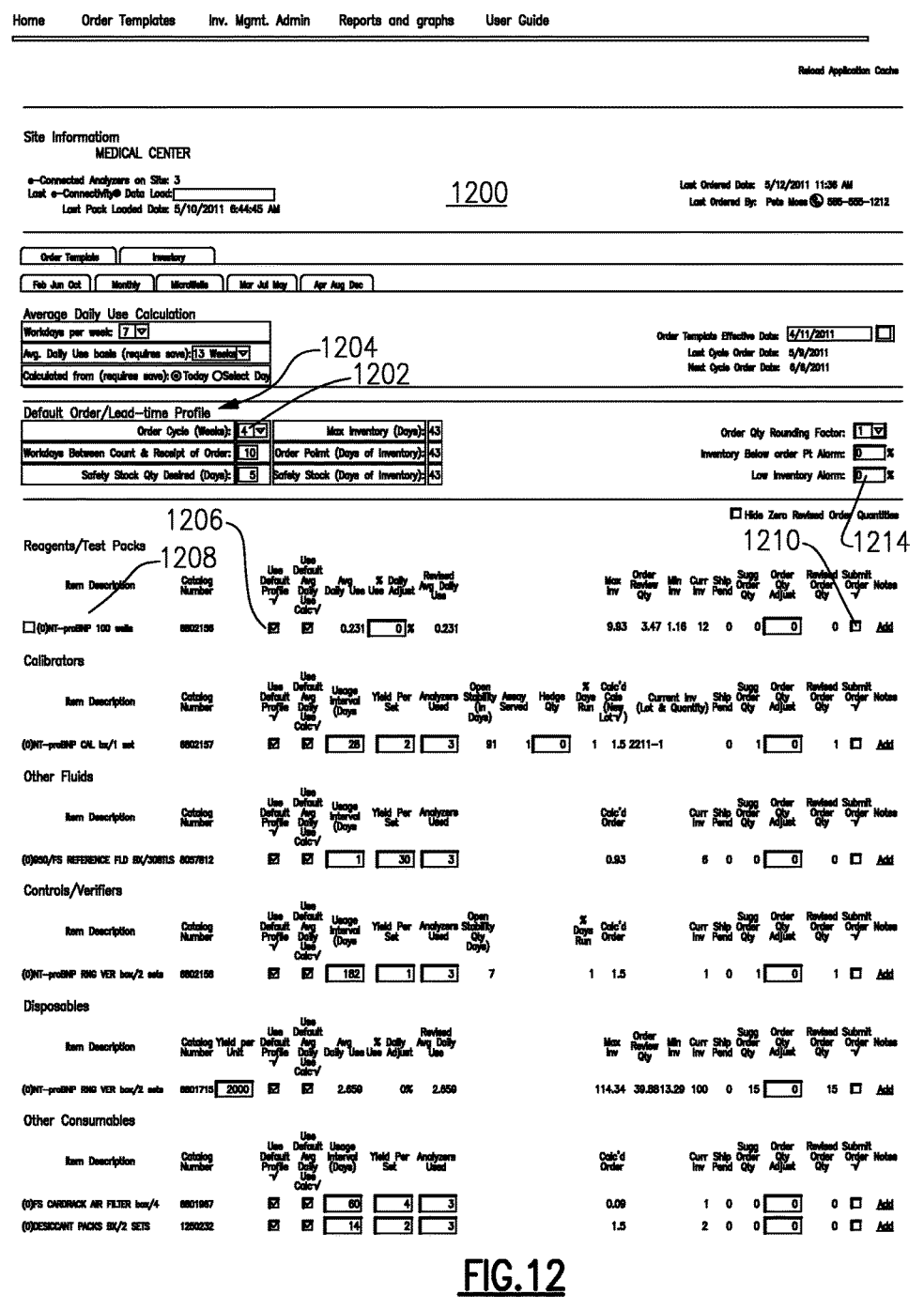

As well as causing the system to update the order quantity values in the data storage means, customer engagement with the run button can cause the system to display a login content page, the introductory content page 400, or any other page preferably providing at least an indirect link to an order template page 1200, an example of which is shown in FIG. 12. The order template page 1200 is configured to display consumable order information including item description, catalog number, average daily use, minimum inventory, maximum inventory, order point, and suggested order quantity, as retrieved from the data storage means and for each consumable associated with a selected order schedule, such as February/June/October or monthly orders, established by the customer through interaction with the pages described above with respect to FIGS. 4-10. The order template page 1200 is further configured to display the selectable workdays per week and average daily use basis which, when revised by a customer through engagement with a drop-down menu 1202, for example, preferably cause the order template page 1200 to display values for the parameters identified above and revised accordingly.

The order template page 1200 is further configured to display a default order profile 1204 including order cycle, workdays between order placement effective dates, safety stock quantity, maximum inventory, order point, and order quantity rounding factor. A check-box 1206 can be provided as associated with each consumable 1208 to allow a customer to selectively assign the default profile 1204 to each consumable 1206. Moreover, one or more of the default profile 1204 parameters can be modifiable thereby causing a revision in the consumable order information values. Also provided is a check-box 1210 to allow a customer to selectively associate a suggested consumable order with the instant order being placed. Upon satisfaction with the parameters of the order template page 1200, a customer can engage a submit button (not shown) and cause the system to establish a purchase order record in the database including associated customer information, consumables associated with the purchase order, and order parameters such as effective date and consumable product cost, for example. The database can then be queried by an administrator, an administrator can be automatically notified of a pending purchase order that can be retrieved by logging into the system, or the purchase order can be automatically sent to an administrator. Automated messaging is well-known in the art and can be in the form of an electronic message with purchase order attachment, for example.

Figure 13:
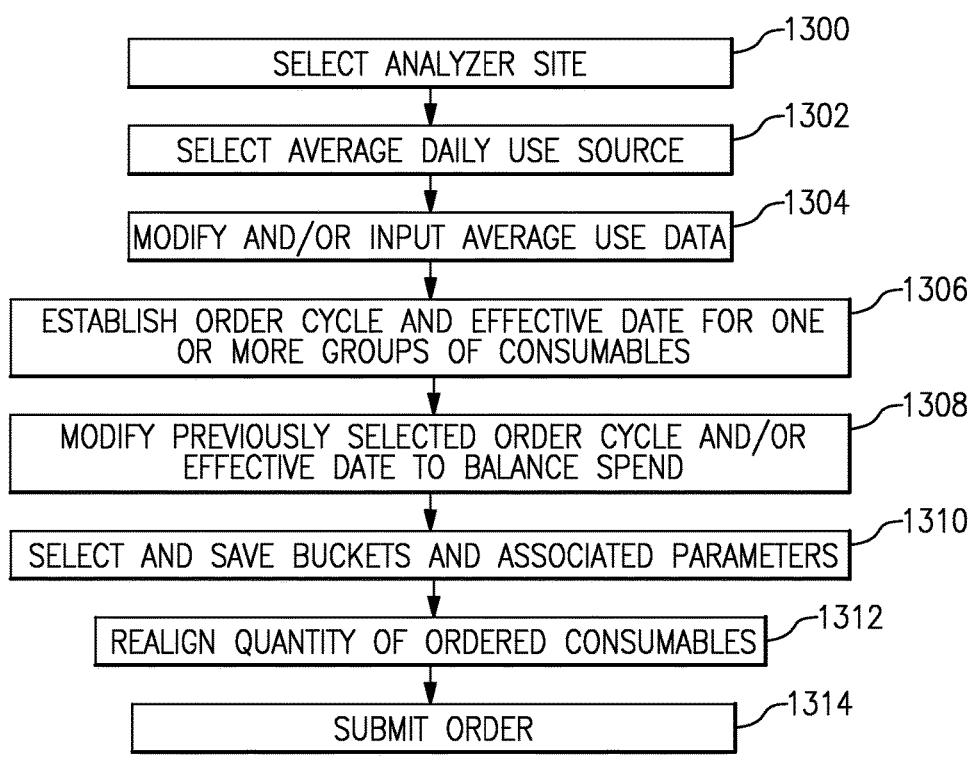
FIG. 13 is a flowchart showing the steps of an exemplary operation of an order placement of the inventory management system.

Referring to FIG. 13, a flowchart is shown summarizing some steps of an exemplary operation of an order management module of the system according to some embodiments of the present invention. In a first step 1300, the customer selects the site at which the analyzer is located, the site options being displayed according to an associated with the customer's login information. In a second step 1302, the customer selects the source of the average daily use data, whether from previously stored data received through monitoring of the analyzer by the server, manually input by the customer, or a combination of both methods for the variety of consumables. In an optional third step 1304, the customer can modify the data retrieved from the database or manually enter the daily use data for a plurality of consumables utilized by the analyzer. In a fourth step 1306, the customer establishes an order cycle and effective date for at least one group of consumables having a shared characteristic such as a calibrator. The dependent relationship of a plurality of reagents is set forth in the database allowing the customer to prepare an order schedule based on the group of associated consumables as opposed to each consumable product. In an optional fifth step 1308, the customer can modify the previously selected order cycle and effective date for the consumable groups by balancing the cost as displayed for a specified order period, if desired. In a sixth step 1310, the customer can save to the database one or more "order buckets," each of which includes consumables and/or consumable groups as previously selected, as well as associated work week, order cycle, and order effective date parameters. In an optional seventh step 1312, the order groups selected by the customer in the fifth step 1308 can be realigned to automatically modify suggested order quantities for days remaining until the order effective date, safety stock days, and shipment days, as calculated and/or stored previously in the database. In an eighth step 1314, the customer can select which previously orders to submit to a consumable supplier for processing.

Referring again to FIG. 12, the order template page 1200 also includes, optionally as part of the default profile 1204, a selectable low inventory alarm parameter 1214 to allow a customer to enter a percentage of consumable remaining or number of usage days remaining based on the before receiving a notification of such threshold inventory level. Rather than automatically place an order, the system is configured to periodically retrieve consumable inventory levels, as described above, and compare the retrieved inventory level values to the estimated levels required to supply the analyzer 108 until the next order based on historical operational data, as compared to the selected low inventory alarm value 1214 based on the time remaining.

Figure 14:
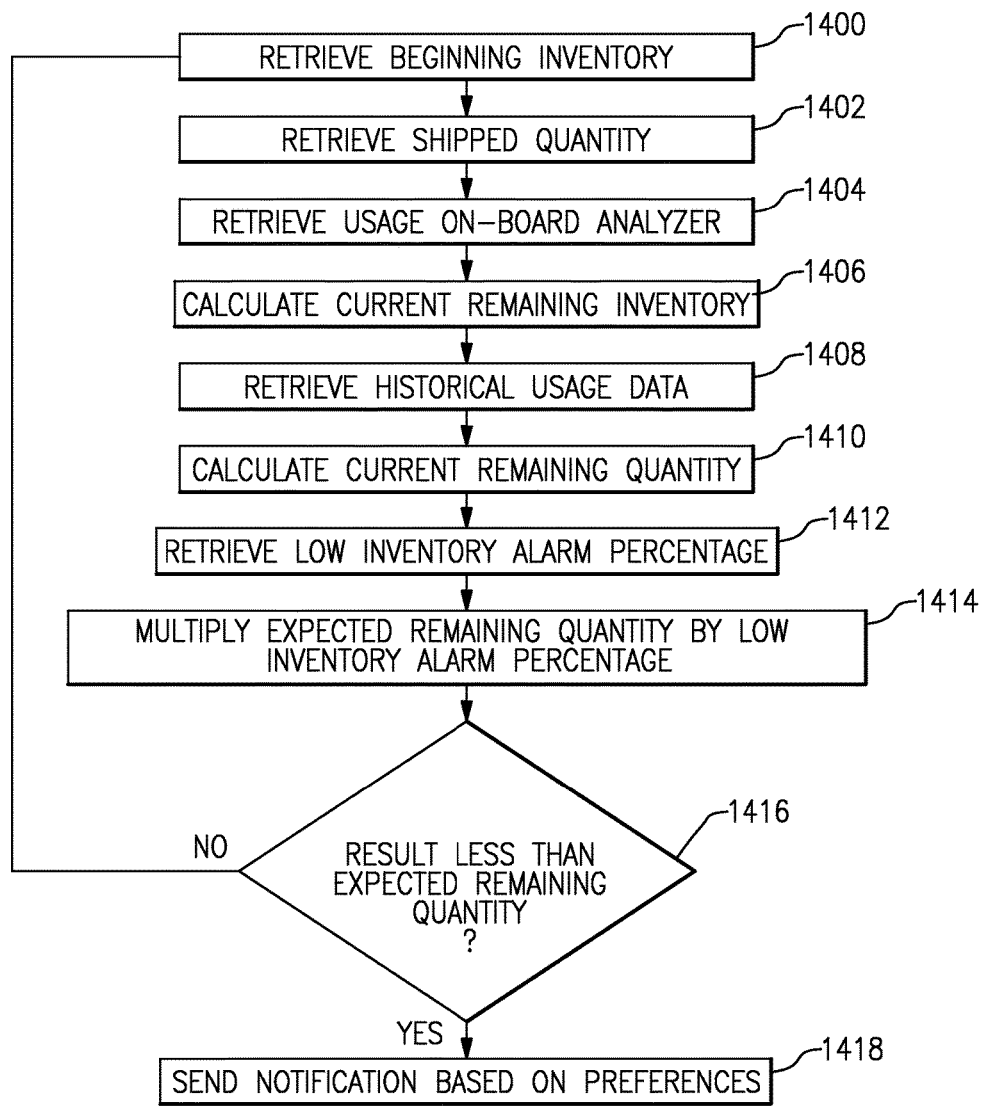
FIG. 14 is a flowchart showing the steps of an exemplary operation of a notification feature of the inventory management system.

In one exemplary operation of the system, as described with reference to the flowchart of FIG. 14, the system is configured to calculate the current inventory remaining for each consumable. In a first step 1402, the system is configured to retrieve from the database, the beginning inventory for each consumable. In a second step 1404, the system is configured to retrieve from the database the quantity of any inventory shipped during the relevant period. In a third step 1406, the system is configured to retrieve the usage on-board the analyzer, such as from the database or by query from the server to the analyzer's local data storage means, for example, as determined as described above based on operational history over the relevant time period. In a fourth step 1408, the system is configured to calculate the current remaining inventory such as by subtract the usage on-board the analyzer from combination of the beginning inventory and shipped quantities. In a fifth step 1410, the system is configured to retrieve from the database the historical usage data over a specified time period, such as at least the length of one previous order cycle for each consumable. In a sixth step 1412, the system is configured to calculate the expected remaining quantity of the consumable based on the historical usage data. In a seventh step 1414, the system is configured to retrieve the low inventory alarm percentage value from the database and in an eighth step 1416 multiply the calculated expected remaining quantity by the low inventory alarm percentage. In a ninth step 1418, the system is configured to compare the result of the prior step's calculation with the current remaining inventory. If the result of the prior step's comparison is less than the current remaining inventory, in a tenth step 1420, the system is configured to automatically send a message to the customer based on selected preferences, as discussed in detail below, the message indicating a low inventory status, including the relevant information, and/or simply requesting a login to the system to retrieve a full inventory status report. Because the notification message is automatic, based on stored and previously selected threshold parameters, a customer does not have to log onto the system to identify critical inventory levels. Moreover, the system of the present invention prevents small orders and their associated management and transportation issues, and allows a customer to review and reconfigure scheduled orders to account for the low inventory status of one or more consumables and/or modify the operation of the analyzer over the time period remaining until the next order of the consumable in a low inventory state. If the monitored consumable is not in a low inventory state based on the calculation of step, the system is configured to return to the first step 1402 to retrieve the beginning inventory for another consumable or finish the monitoring process, for example.

In order to further facilitate notifications, the system includes a message selection content page 1500 accessible to customer of the system, an example of which is shown in FIG. 15. While the system is described above with respect to a low inventory alert, several other message types 1504 can be supported by the system including order acknowledgement, order review quantity, time to order, calibration, minimum inventory quantity, data transmission, and calibrator lot required. By engaging one or more check-boxes 1506, for example, associated with each alert, a customer can select the method of alert receipt, such as by short message service (SMS) or electronic mail, as well as which site or installations the customer is interested in receiving alerts from. By engaging a save button 1502, for example, the customer's selections can be stored in the database as associated with the customer.

To further facilitate SMS messaging, the system includes a customer mobile settings content page 1600, an example of which is shown in FIG. 16. The mobile settings content page 1600 allows the customer to input a cellular telephone number, carrier, whether SMS messages can be sent to the telephone number, maximum number of daily SMS, and times SMS messages are allowable, for example. By engaging a save button 1602, for example, the customer's selections can be stored in the database as associated with the customer.

Figure 17:
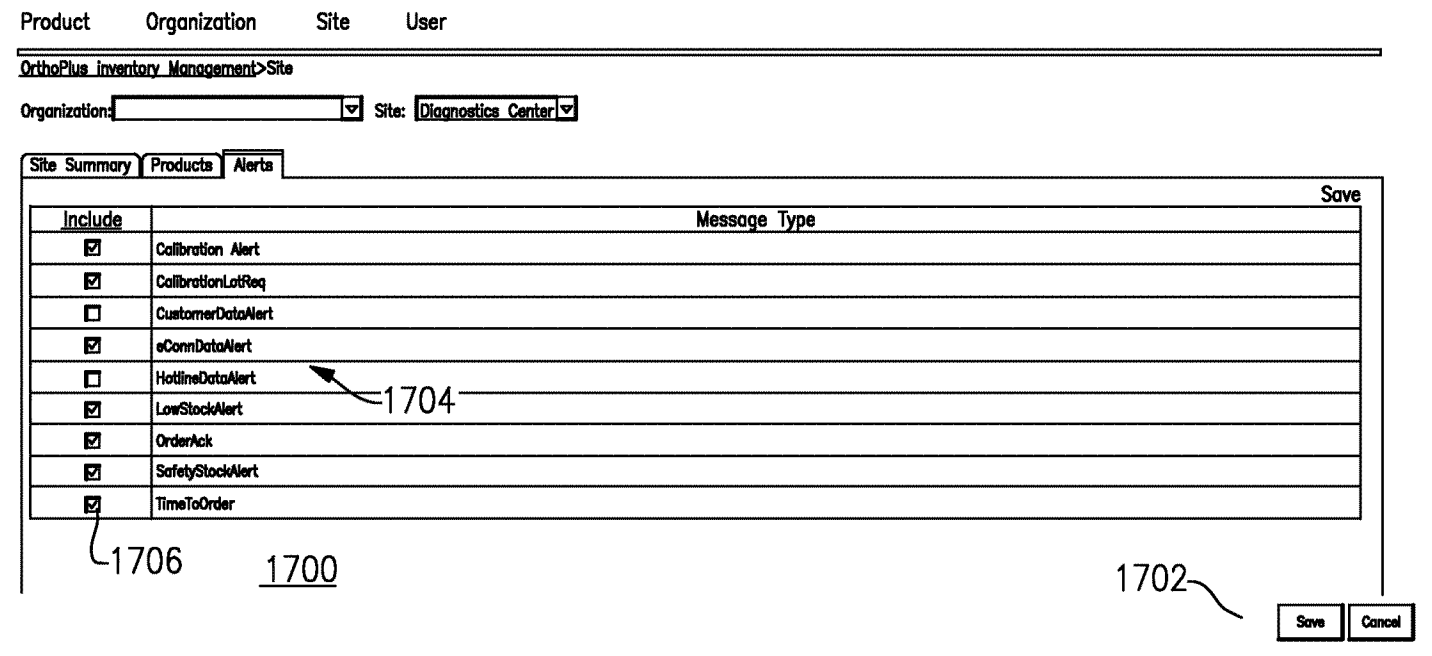

In order to establish the messages utilized by the system, the system includes an administrator message type selection content page 1700, an example of which is shown in FIG. 17. The administrator message type selection content page 1700 is accessible by permitted administrators and displays the universe of message types 1704, as stored in the database, as well as one or more check-boxes 1706, for example, to allow an administrator to selectively turn on or more message types on and off with respect to all customer of the system. By engaging a save button 1702, for example, the customer's selections can be stored in the database as associated with the customer.

Figure 18:
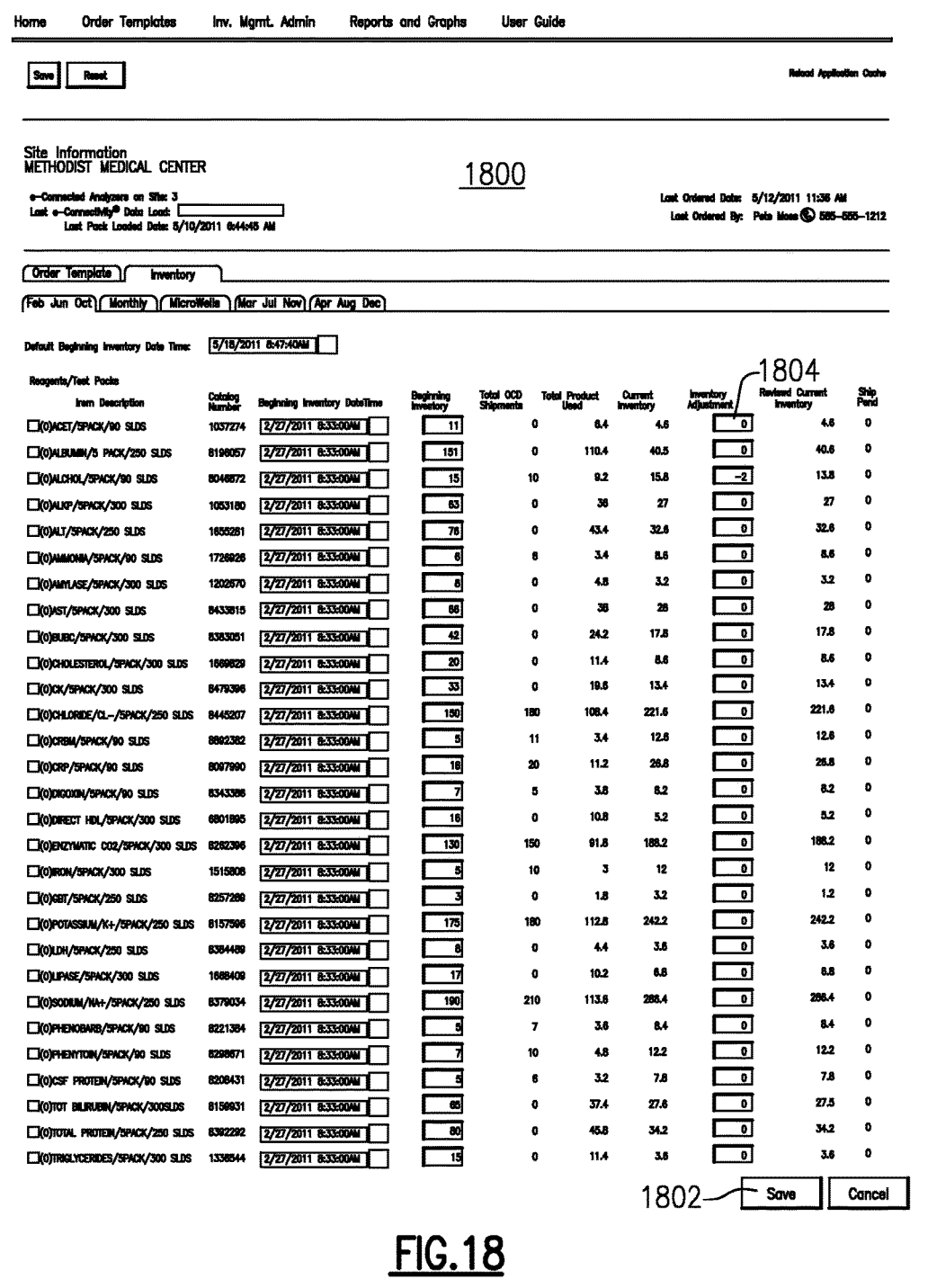

The system of the present invention, as described in detail above, allows for efficient consumable product order management including by grouping of consumables having shared characteristics, preparing and scheduling orders, and cost balancing. While the notification/alert and messaging aspects of the system provide for automated inventory management for threshold conditions, the system also provides inventory status and management through an inventory display content page 1800 accessible by a customer, an example of which is shown in FIG. 18. The inventory display page 1800 is configured to communicate with the database to display beginning inventory levels of consumable products associated with an analyzer 108 or a laboratory or site, as manually entered by the customer, either through the system or by separate means, and saved in the database. The inventory display page 1800 is further configured to display estimated remaining inventory by adding the beginning inventory levels and shipment quantities, as stored in the database, and subtracting the cumulative usage of all networked-connected analyzers associated with the customer or site, as retrieved by the system through network communication with the analyzer, the customer or site stored in the database such as by a universal customer number, for example. An optional inventory adjustment 1804 allows a customer to communicate to the system an unexpected change in inventory levels for a consumable such as resulting from an accidental mishandling and/or waste of a reagent. Any inventory adjustment 1804 can be added or subtracted by the system, as the case may be, to the previously calculated estimated remaining inventory. By engaging a save button 1802, for example, the customer can revise the current inventory remaining value stored in the database as updated based on the selectable beginning inventory and/or inventory adjustment values. Accordingly, the inventory display page 1800 allows a customer to visualize the current state of the consumable products associated with an analyzer 108 according to the database as determined by network communication of the server 104 with the analyzer 108.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An order management forecasting system for a site, said system comprising:
    a plurality of clinical analyzers for the site, each clinical analyzer of the plurality of clinical analyzers having:
        an associated plurality of consumables for conducting a plurality of patient-related tests on a daily basis; and
        a plurality of sensors on each analyzer comprising at least one of an optical sensor, a capacitive sensor or a pressure sensor and having sensor data indicative of events on-board the clinical analyzer involving the plurality of consumables, the sensor data comprising at least optical sensor data, capacitive sensor data or pressure sensor data;
    a server including:
        a processor;
        a network interface for communicating with each clinical analyzer;
        data storage means for storing:
            relationship information for each consumable;
            current inventory for each consumable; and
            usage history for each consumable as determined by the sensor data indicative of events on board each clinical analyzer;
        a portal accessible by a plurality of remote computers and associated authenticated users through the network interface and in which sensor data from each analyzer is transmitted to a central server over said portal; and
        an order management module including program instructions that, when executed by the processor, are configured to:
        calculate dependencies of consumables of the plurality of clinical analyzers for each customer at each site;
        project usage history of each clinical analyzer at each site;
        forecast a consumable order schedule based on the relationship information, current inventory, and the projected usage history of each analyzer at a site based on the sensor data including the at least optical sensor data, capacitive sensor data or pressure sensor data from each analyzer, the calculated dependencies of consumables of the plurality of clinical analyzers for each customer at each site, wherein the forecasted consumable order schedule includes a plurality of consumable planning buckets that include common consumables for purposes of creating a balanced spend for the site wherein the plurality of consumables is selected from at least one of the group consisting of reagents, calibrators, controls, verifiers, fluids, and disposables.

2. The order management forecasting system of claim 1 wherein the data storage means is further configured to store at least one of consumable item description, catalog number, pending ship quantity, and suggested order quantity.

3. The order management forecasting system of claim 1 wherein the relationship information includes an associated calibrator for each reagent.

4. The order management forecasting system of claim 1 further comprising at least one interface accessible through the portal for selecting one or more parameters selected from at least one of the group consisting of customer information, payment information, items to be ordered, quantity of items to be ordered, order cycle, workdays between order, safety stock days, workdays per week, and number of assays served for each consumable.

5. The order management forecasting system of claim 4 wherein the order management module further includes program instructions configured to display, in the at least one interface accessible through the portal, the calculated order information in the form of one or more user selectable parameters selected from the group consisting of groups of consumables, suggested order quantity of each consumable in each group of consumable, and timing of purchase.

6. The order management forecasting system of claim 5 wherein the order management module further includes program instructions configured to communicate, using the network interface, a purchase order to a supplier of consumables based on the user selections.

7. The order management forecasting system of claim 1 wherein the data storage means is further configured to store consumable ordering history associated with each clinical analyzer.

* * * * *